W. H. C. SMITH.
AUGER.

No. 175,384. Patented March 28, 1876.

WITNESSES:
Chas. Nicto
John Goethals

INVENTOR:
W. H. C. Smith
BY
ATTORNEYS.

UNITED STATES PATENT OFFICE.

WILLIAM H. C. SMITH, OF PAWTUCKET, RHODE ISLAND.

IMPROVEMENT IN AUGERS.

Specification forming part of Letters Patent No. 175,384, dated March 28, 1876; application filed February 21, 1876.

*To all whom it may concern:*

Figure 1:
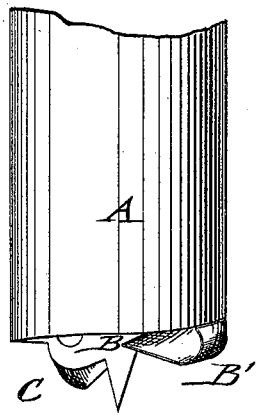
Figure 2:
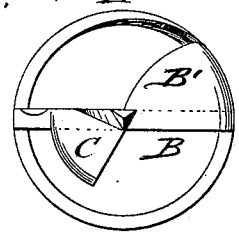

Be it known that I, WILLIAM H. C. SMITH, of Pawtucket, in the county of Providence and State of Rhode Island, have invented an Improvement in Augers, of which the following is a specification:

In the accompanying drawing, Figure 1 represents a side view of my improved auger. Fig. 2, a bottom view, and Fig. 3 a vertical central section, of the auger, showing side view of the bit.

Similar letters of reference indicate corresponding parts.

My invention relates to an improved hollow auger for boring wooden conductors, being so constructed that the wood is chipped up to allow it to fall down through the auger without clogging. The invention consists of a hollow auger with bits of different size and height, and also of the attaching of the bit to the auger by side projections, grooves, and a fastening-screw.

In the drawing, A represents a hollow auger for boring wooden conducting-tubes, &c. B is the bit, which has two lips of unequal size, one lip, B′, extending radially from the pointed center-pin to the circumference of the auger, sharpened at the point of connection, and serving to bore the hole at the required diameter, the other lip, C, being shorter and extending in front of the larger lip B′ to break the wood in advance of the longer bit into small chips and admit the passage of the same through the auger without clogging.

Figure 3:
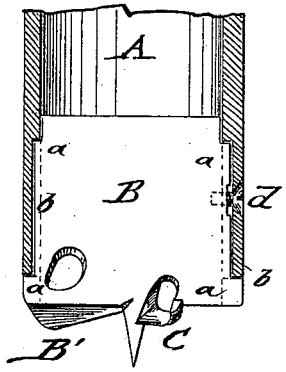

The bit B is secured to the auger by side projections or shoulders a, which fit corresponding interior grooves and end recesses of the auger, as shown in Fig. 3. A fastening-screw, d, passes through a hole of the auger into the side of the bit, and retains the same rigidly until the screw is removed for taking out the bit, for sharpening or replacing it by a new one.

Having thus described my invention, what I claim as new, and desire to secure by Letters Patent, is—

1. The bit B secured in an auger-tube, A, by projections on the former fitting into grooves and recesses of the latter, as shown and described.

2. The combination with a radial boring-lip, B′, of a short cutting-lip, C, arranged in front thereof, as shown and described, to divide the chip and cause the auger to throw out the wood in small pieces.

WILLIAM H. C. SMITH.

Witnesses:
 NELSON CARPENTER,
 JAMES T. BLISS.